US010902003B2

(12) United States Patent
Hwang et al.

(10) Patent No.: US 10,902,003 B2
(45) Date of Patent: Jan. 26, 2021

(54) GENERATING CONTEXT AWARE CONSUMABLE INSTRUCTIONS

(71) Applicant: International Business Machines Corporation, Armonk, NY (US)

(72) Inventors: Jinho Hwang, Ossining, NY (US); Anup Kalia, Elmsford, NY (US); Muhammed Fatih Bulut, New York, NY (US); Maja Vukovic, New York, NY (US); Jin Xiao, Ossining, NY (US); Rohit Madhukar Khandekar, Yorktown Heights, NY (US); Raghav Batta, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/267,482

(22) Filed: Feb. 5, 2019

(65) Prior Publication Data

US 2020/0250195 A1    Aug. 6, 2020

(51) Int. Cl.
*G06F 16/30* (2019.01)
*G06F 16/2457* (2019.01)
*G06N 5/02* (2006.01)
*G06F 11/14* (2006.01)
*G06N 3/04* (2006.01)

(52) U.S. Cl.
CPC .... *G06F 16/24575* (2019.01); *G06F 11/1492* (2013.01); *G06F 16/24578* (2019.01); *G06N 3/0445* (2013.01); *G06N 5/02* (2013.01)

(58) Field of Classification Search
CPC ......... G06F 16/24575; G06F 16/24578; G06F 16/904
USPC ....... 707/607, 609, 687, 705, 769, 790, 813, 707/821
See application file for complete search history.

(56) References Cited

U.S. PATENT DOCUMENTS

| 8,959,082 | B2 | 2/2015 | Davis et al. |
| 9,495,460 | B2 | 11/2016 | Taylor et al. |
| 2010/0131265 | A1 | 5/2010 | Liu et al. |
| 2010/0241647 | A1 | 9/2010 | Ntoulas et al. |
| 2015/0278355 | A1 | 10/2015 | Hassanpour et al. |
| 2016/0306798 | A1 | 10/2016 | Guo et al. |
| 2017/0235848 | A1* | 8/2017 | Van Dusen ........... G06F 16/904 705/12 |
| 2017/0255627 | A1 | 9/2017 | Coll et al. |
| 2018/0196753 | A1* | 7/2018 | Bitincka ............. G06F 12/0873 |
| 2019/0235941 | A1* | 8/2019 | Bath ..................... G06F 11/079 |

* cited by examiner

*Primary Examiner* — Sana A Al-Hashemi
(74) *Attorney, Agent, or Firm* — Lieberman & Brandsdorfer, LLC

(57) ABSTRACT

A system, program product, and method for use with an information handling system to detect and resolve faults in a run-time environment. As faults are detected, one or more corresponding general query responses are identified and subject to a ranking based on relevance criteria. At least one modified response is transformed into a command, selectively blended with context, and encoded as a context aware instruction. The instruction is subject to testing with corresponding output being subject to measurement.

15 Claims, 10 Drawing Sheets

GENERATING CONTEXT AWARE CONSUMABLE INSTRUCTIONS

BACKGROUND

The present embodiments relate to automation of error resolution with respect to information technology (IT). More specifically, the embodiments relate to environmental context awareness and application to a context-aware consumable instruction for error resolution.

In the field of artificially intelligent computer systems, natural language systems (such as the IBM Watson® artificially intelligent computer system or other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial Intelligence (AI), utilizes algorithms to learn from and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive computing systems, also referred to herein as cognitive systems, are inherently non-deterministic. Specifically, data output from cognitive systems are susceptible to information provided and used as input. For example, as new machine learning models are deployed there is no guarantee that the system will extract the same entities or the same linguistic relationships as done previously. New models may adversely affect prior model results. Accordingly, there is a need to create deterministic and predictive behavior in the cognitive systems.

SUMMARY

The embodiments include a system, computer program product, and method for error resolution and evolution of a corresponding context aware instruction that incorporates and applies context to a consumable instruction.

In one aspect, a system is provided for use with an information handling system that supports natural language processing. A processing unit is operatively coupled to memory and is in communication with an information handling system. Tools are provided in communication with the processing unit, including a query manager, a context manager, and an evaluator. The query manager functions to detect a fault in a run-time environment and to generate a search query command that is related to the fault. In addition, the query manager identifies relevance criteria with respect to the query and the detected fault, applies the criteria to one or more corresponding query responses, and prioritizes the one or more responses based on the criteria. Using the prioritization, the query manager selects one of the one or more query responses and transforms it into a consumable command. The context manager functions to identify context that corresponds to the detected fault, selectively blend the context into the consumable command, and encode the command into an instruction. Thereafter, the evaluator tests the instruction and measures test output. The processing unit selectively executes the commands via the corresponding instruction responsive to the measured test output.

In another aspect, a computer program device is provided for use with an information handling system that applies context to a consumable instruction. The device has program code that is executable by a processing unit. Program code is provided to detect a fault in a run-time environment and to generate a search query command that is related to the fault. In addition, the program code identifies relevance criteria with respect to the query and the detected fault, applies the criteria to one or more corresponding query responses, and prioritizes the one or more responses based on the criteria. Using the prioritization, program code is provided to select one of the one or more query responses and transform it into a consumable command. Program code identifies context that corresponds to the detected fault, selectively blends the context into the consumable command, and encodes the command into an instruction. Thereafter, program code tests the instruction and measures test output. The processing unit selectively executes the commands via the corresponding instruction responsive to the measured test output.

In yet another aspect, a method is provided for use by an information handling system to apply context to a consumable instruction. In response to detecting a fault in a run-time environment, a search query command related to the fault is generated. In addition, relevance criteria with respect to the query and the detected fault are identified, the criteria is applied to one or more corresponding query responses and the one or more responses are prioritized based on the criteria. Using the prioritization, one of the one or more query responses is selected and transformed into a consumable command. Context that corresponds to the detected fault is identified, selectively blended into the consumable command, and encoded into an instruction. Thereafter, the instruction is subject to testing and test output is measured. The command is selectively executed via the corresponding instruction responsive to the measured test output.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Computational linguistics is the application of computer science to analysis, synthesis and comprehension of written and spoken language. A computational understanding of language provides insight into substantive aspects of linguistic elements in underlying texts, and improves the relationship between computer commands and language. As shown and described herein, cognitive computing is applied to an IT operational environment, and specifically to error and fault resolution. The embodiments described herein relate to integrating query searches and corresponding query results with contextual analysis of a run-time environmental error. Artificial intelligence (AI) is employed to modify behavioral output of a run-time query. In one embodiment, a neural network and associated computational models identify complex relationships and patterns. As described in detail herein, an AI platform is employed to identify such relationships corresponding to a run-time environment, and to dynamically transform queried information into consumable information.

Figure 1:
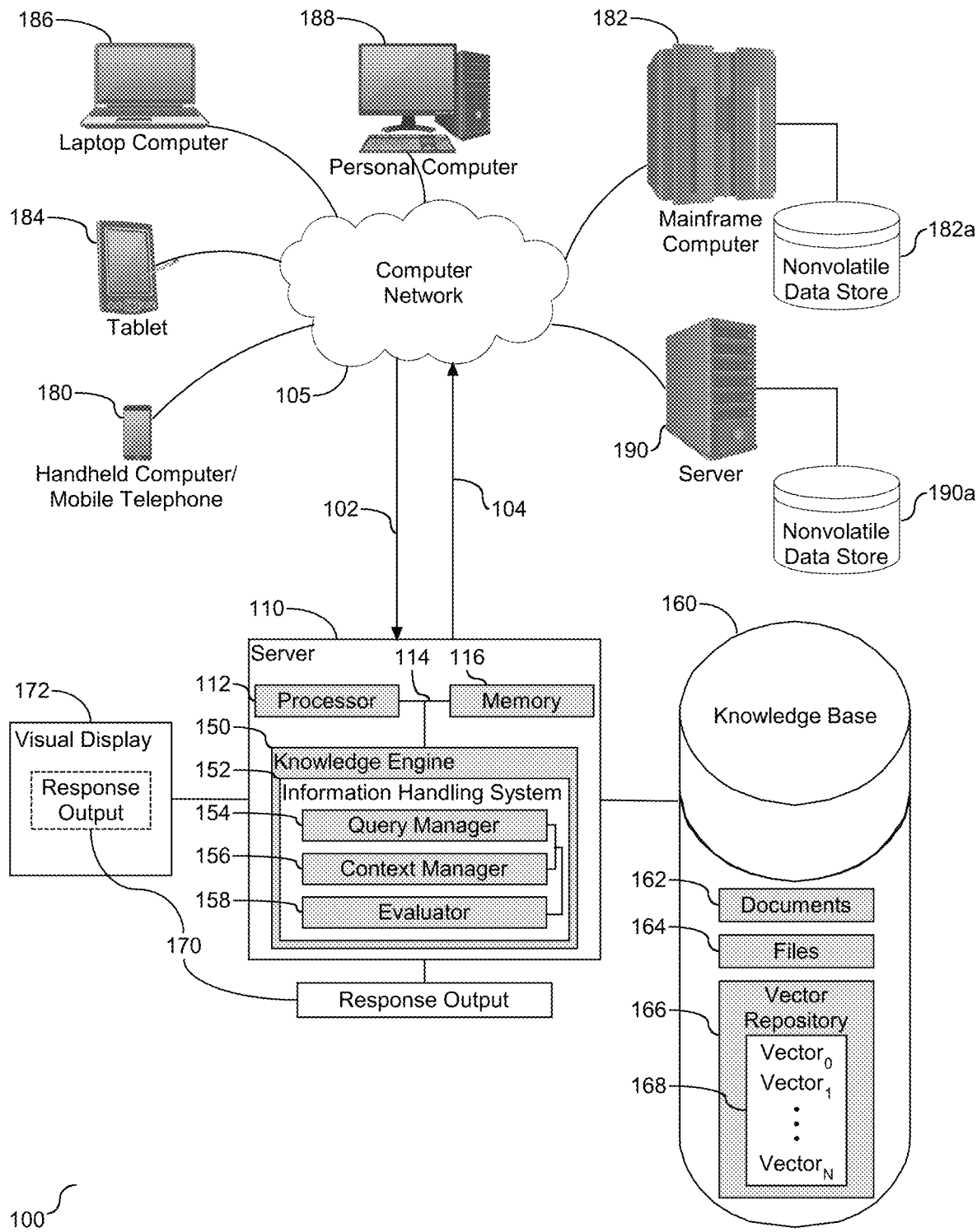
FIG. 1 depicts a system diagram illustrating a schematic diagram of a computer system configured to provide fault detection resolution in a run-time environment.

Referring to FIG. 1, a schematic diagram of a computer system (100) is depicted to provide fault detection resolution in a run-time environment. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with a knowledge engine (150) configured to support and enable artificial intelligence (AI) for detection and resolution of a fault over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable processing of context for one or more content users. Other embodiments of the server (110) may be used with components, systems, sub-systems, and/or devices other than those that are depicted herein.

The knowledge engine (150) may be configured to receive input from various sources. For example, the knowledge engine (150) may receive input from the network (105), one or more knowledge bases or corpus (160) of electronic documents (162) or files (164), or other data, content users, and other possible sources of input. In selected embodiments, the knowledge base (160), also referred to herein as corpus, may include structured, semi-structured, and/or unstructured content in a plurality of documents that are contained in one or more large knowledge databases or corpora. The various computing devices (180), (182), (184), (186), and (188) in communication with the network (105) may include access points for content creators and content users. Some of the computing devices may include devices for a database storing the corpus of data as the body of information used by the knowledge engine (150), and to process the corpus of data with respect to fault resolution based on context, thereby enhancing AI, and in one embodiment natural language processing (NLP), based services. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the corpus (160) with the knowledge engine (150) including one or more interfaces to respond accordingly.

As shown, content may be in the form of one or more electronic documents (162) or files (164) for use as part of the corpus (160) of data with the knowledge engine (150). The corpus (160) may include any structured and unstructured documents, including but not limited to any file, text, article, or source of data (e.g. scholarly articles, dictionary definitions, encyclopedia references, and the like) for use by the knowledge engine (150). Content users may access the knowledge engine (150) via a network connection or an internet connection to the network (105), and may submit natural language input to the knowledge engine (150) that, in one embodiment, may effectively be processed into context-based word vector representation. As further described below, the word vector representation functions as a model to summarize context which is applied to a blended command to resolved the detected fault.

The documents (162) or files (164), hereinafter collectively referred to as content, e.g. given by a problem definition or extracted from behavior, is communicated to the knowledge engine (150), so that the content (162) and (164) may be interpreted and utilized with command processing and execution. As shown, the knowledge engine (150) is local to the server (110). In some illustrative embodiments, the server (110) may be the IBM Watson® system available from International Business Machines Corporation of Armonk, New York, which is augmented with the mechanisms of the illustrative embodiments described hereafter. As shown, the server (110) includes information handling system (152) embedded within the knowledge engine (150), which utilizes tools in the form of a query manager (154), a context manager (156), and an evaluator (158). Though shown as being embodied in or integrated with the server (110), the information handling system (152) and the associated query manager (154), context manager (156), and evaluator (158) may be implemented in a separate server (e.g., 190) that is connected across network (105) to the server (110). Wherever embodied, the query manager (154), context manager (156), and evaluator (158), function to provide and assess contextual analysis of a query corresponding to a fault detected in a run-time environment.

The query manager (154) functions to detect and respond to a fault in a run-time environment. It is understood that submission of a query may generate or otherwise detect a fault, and in order to process the query the fault needs to be resolved. In computer science, a fault is understood as an incorrect step, process, or data definition in a computer program which causes the program to perform in an unintended or unanticipated manner. Faults are resolved by correcting the syntax of the command(s) that are the source of the fault, or in one embodiment replacing the commands that is the source of the fault. Publicly available information and resources may be sought to correct the fault. However, it is understood that the public information is directed at general purposes and may not be solely reliable or pertinent to the required or desired correction since the public information is not context aware. At the same time, it is understood that the public information related to resolving the fault may have some value. The query manager (154) utilizes the public information to receive or otherwise identify at least two general query responses that correspond to the detected fault. Since these query responses are classified as general, they may include general syntax to support the query, but do not account for context directed at the fault, and more specifically fine details of the fault that may be particular to query characteristics and corresponding query environment.

General query responses are directed at general purpose information and do not include context awareness to understand environment and environment characteristics. Examples of general or publicly available fault information include, but are not limited to, Server Fault and Stack Overflow. The query manager (154) identifies relevance criteria from a query that is associated with the detected fault. It is understood that relevance criteria may be related to, but does not include, context. The identified relevance criteria are applied to the general query responses so that the query manager (154) may utilize this application to rank or otherwise assign a priority to the general query responses. Accordingly, the first part of the fault resolution is directed at identifying general query responses related to the identified fault, and placing the general query response in an order based on identified relevance criteria.

It is understood that relevance criteria is broad and does not necessarily include fault related context. At the same time, it is understood that one or more elements of the general query response may contribute to resolving the query. Prior to identifying and incorporating context into a query response, the query manager (154) selects one of the general query responses responsive to the ranking. For example, in one embodiment, the query manager (154) selects the general query response with the highest ranking. The initial fault resolution selection is directed at a general query response and associated relevance criteria. Once the selection is complete, the query manager (154) transforms or otherwise converts the format of the general query response to a consumable command format. It is understood that different run-time environments may have different formatting requirements. For example, a first run-time environment may require the query response to be in a first command format, and a second run-time environment may require the query response to be in a second command format. Accordingly, the query manager (154) ensures that the query response is appropriately formatted for the run-time environment.

As shown in FIG. 1, the context manager (156) is operatively coupled to the query manager (154). The context manager (156) functions to identify query related context and to integrate the identified context into the query response. More specifically, the context manager (156) identifies the circumstances and characteristics that form the setting of the identified fault. The identified context describes the identified fault to bring understanding and comprehension into the corresponding fault resolution. Using the identified circumstances and/or characteristics, hereinafter referred to collectively as context, the context manager (156) blends the identified context into the general query response identified by the query manager (154), and creates a transformed command that blends the context with the general query response. This blending effectively adopts the identified context with the general purpose command to create a de-generalized context-aware consumable instruction. The following is an example of problem and a corresponding resolutions with a de-generalized command line:

Problem: Server (prod.server2008.com running Windows 2008, with no automation engine) records the system error message with the status code: 0xc0000008

Query/Search: Windows 2008 with status code 0xc0000008

Best Answer:
Windows 2008—Security Log Flood with Event ID 521—Unable to log events to security log with Status code : 0xc0000008

Error code 0xC0000008 (STATUS_INVALID_HANDLE) means an invalid HANDLE was specified. This could be caused by corrupt security event log. Please try to rename the security event log %SystemRoot%\System32\Winevt\Logs\Security.evtx to an old. Then restart the server to re-create a new security event log. See if the problem gets resolved.

De-Generalization:
Powershell commandline
Invoke-Command-ComputerName SERVERNAME-ScriptBlock {ren %SystemRoot%\System32\Winevt\Logs\Security.evtx %SystemRoot%\System32\Winevt\Logs\Security.evtx.bak} shutdown/r/t 0

In addition, this blending includes the context manager (156) to encode the blended command as an instruction that is compatible with the run-time environment. Accordingly, the context manager (156) identifies and adopts corresponding context, creates a blended command by integrating the context into the selected general purpose command, and transforms the blended command into a context-aware instruction.

The context manager (156) functions as an artificial intelligence (AI) tool to identify context related to the fault.

The context manager (156) runs a recurrent neural network based model to generate vectors (168) for the identified context. Although shown in the knowledge base, in one embodiment, the generated vectors (168) may be stored in memory local to the server (110). Similarly, in one embodiment, the generated vectors (168) are stored in the vector repository (166). In one embodiment, the context manager (156) generates word vectors for the identified context using a word vector generation model to represent context in the corpus as a collection set of word pairs and the frequencies of the word pairs. With these vectors, the evaluator (158) measures the tested command by application of a distance function and weight. The distance is utilized as a measurement to maximize relevance to the fault detected by the query manager (154). In one embodiment, the evaluator (158) assigns a weight to each tested command based on the calculated distance. Accordingly, the strength of the command is reflected with the corresponding weight.

Figure 4:
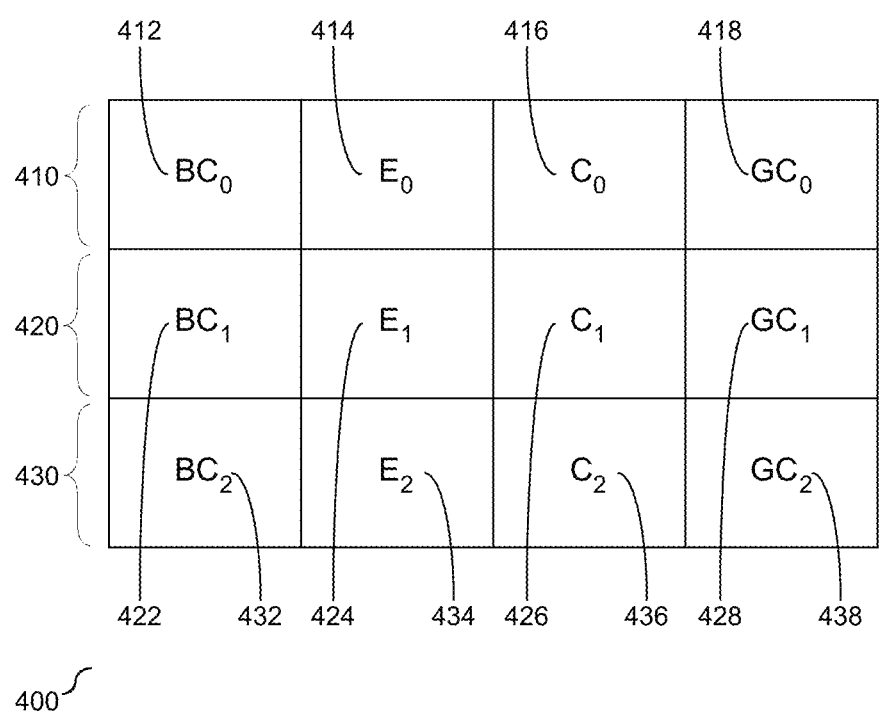
FIG. 4 depicts a block diagram to illustrate a structure of blended commands for use as a resource in resolving faults in the run-time environment.

The neural network model invoked by the context manager (156) is subject to expansion. As blended commands are subject to testing and context evaluation, the evaluator (158) effectively constructs a corpus or library of commands and in one embodiment, a corresponding command map of identified context, detected fault, and a corresponding blended command. See FIG. 4 illustrating an example structure, e.g. map, of blended commands associated with an identified error, identified context, and a general command. The context manager (156) may consult the map to identify a pattern, and from the pattern identify an appropriate blended command. In one embodiment, the context manager (156) applies a distance parameter to identify a relationship between a detected fault and one or more blended commands in the corpus. The distance parameter functions to ensure that the fault and possible blended commands are proximal or within a defined vicinity. In one embodiment, the distance parameter functions as a relevance score between the detected fault and the identified blended commands. In one embodiment, two or more blended commands may be available within the defined vicinity, and the context manager (156) may select the command with the shortest distance. Similarly, in one embodiment, the context manager (156) may use a secondary or alternative characteristic to select the command. Once the blended command is identified and selected, the context manager (156) applies the selected command to resolve the detected fault. Accordingly, the neural network and the corresponding pattern(s) are leveraged to identify a blended command to resolve the fault.

The evaluator (158), shown here as operatively coupled to the query and context managers (154) and (156), respectively, functions as a quality control measure to evaluate the context-aware instruction with respect to the run-time environment. The evaluator (158) conducts one or more tests on the context aware instruction in a private testing environment. Output from the one or more tests is used as a measurement, which in one embodiment, is used to identify whether the context aware instruction qualifies to resolve the identified fault. Based on the output from the evaluator (158), the processing unit (112) selectively executes the context-aware instruction.

As shown, the information handling system (152) employs three tools, e.g. sub-engines, to support application of natural language processing for context identification and application, including the query manager (154), the context manager (156), and the evaluator (158). The functionality of each tool is shown and described herein. Together, the tools (154)-(158) identify and process context with respect to fault resolution, and selectively integrate context into command transformation, effectively customizing the fault resolution with environmental characteristic(s). Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using a computer network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

Figure 2:
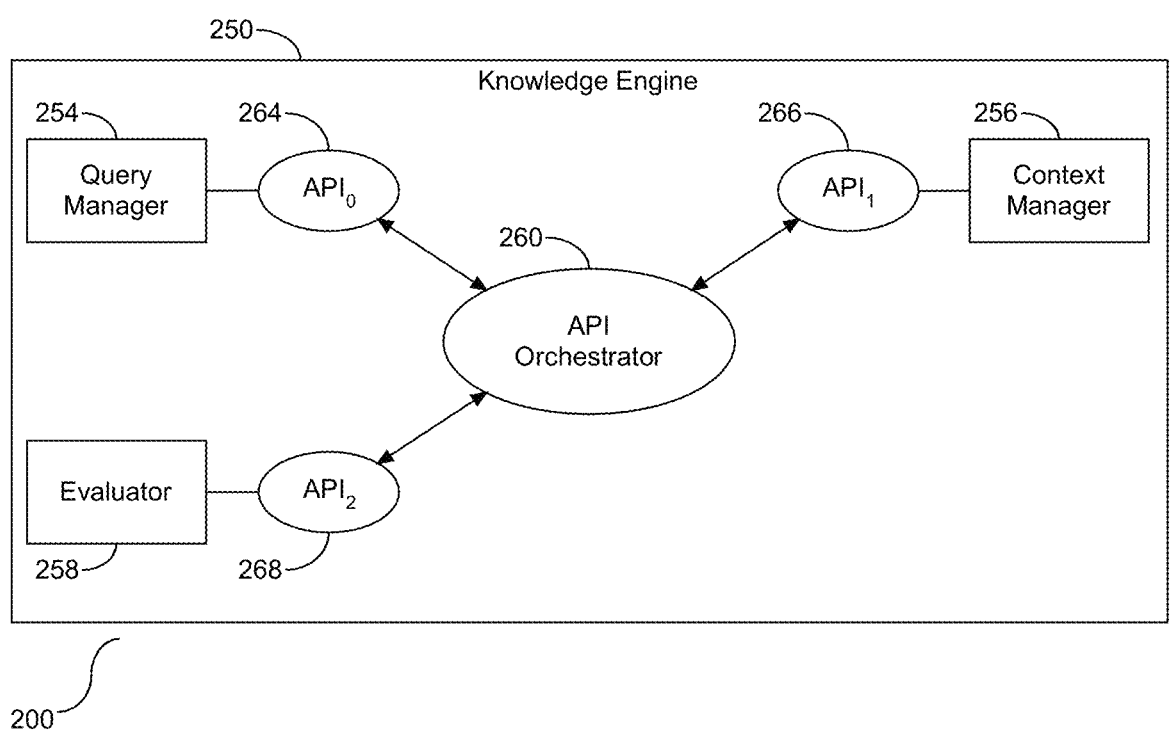
FIG. 2 depicts a block diagram illustrating the tools shown in FIG. 1 and their associated application program interfaces (APIs).

An Application Program Interface (API) is understood in the art as a software intermediary between two or more applications. With respect to the knowledge engine (150) shown and described in FIG. 1, one or more APIs may be utilized to support one or more of the tools (154)-(158) and their associated functionality. Referring to FIG. 2, a block diagram (200) is provided illustrating the tools (154)-(158) shown and described in FIG. 1 and their associated APIs. As shown, a plurality of tools are embedded within the knowledge engine (250), with the tools including the query manager (254) associated with $API_0$ (264), the context manager (256) associated with $API_1$ (266), and the evaluator (258) associated with $API_2$ (268). Each of the APIs may be implemented in one or more languages and interface specifications. $API_0$ (264) provides functional support to detect the fault in the run-time environments and identify general query responses; $API_1$ (266) provides functional support to identify context that corresponds to the detected fault, to integrate the context into a command, and encode the integrated command as a context-aware instruction; and $API_2$ (268) provides functional support to test and evaluate the integrated command. As shown, each of the APIs (264), (266), and (268) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
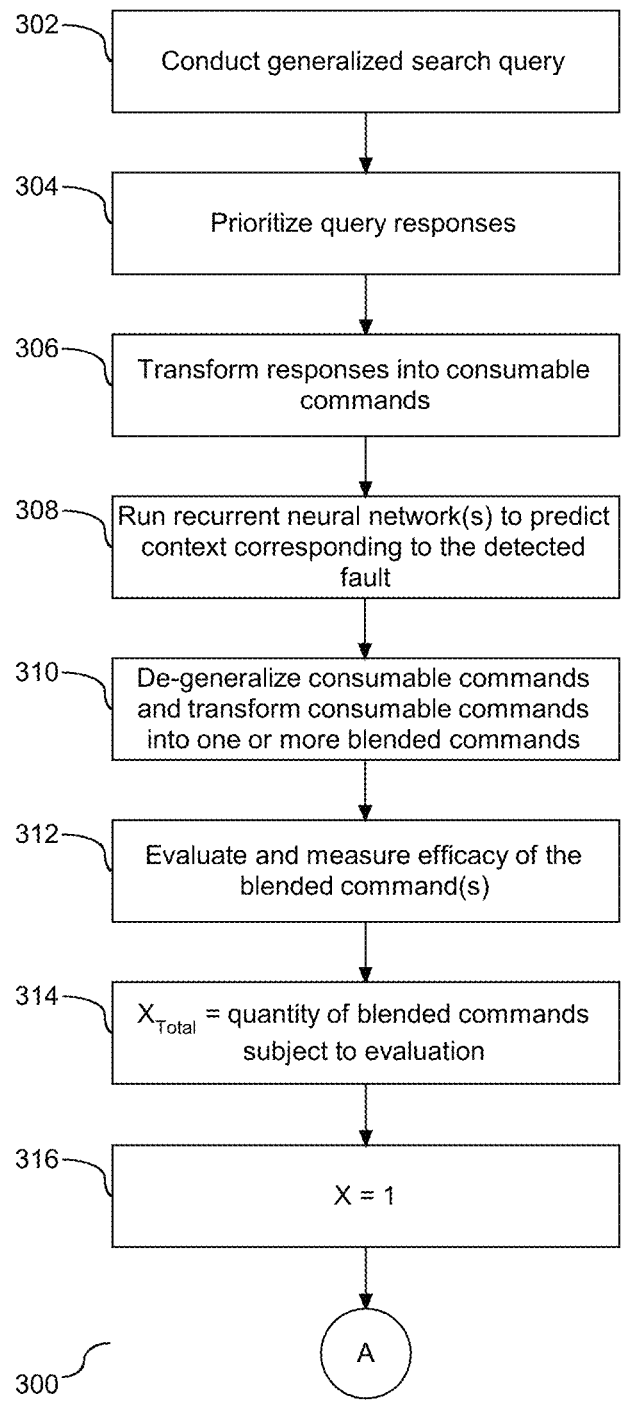
FIG. 3A and FIG. 3B together depict a flow chart illustrating a process for integrating context into an instruction to resolve a fault in a run-time environment.
Figure 3B:
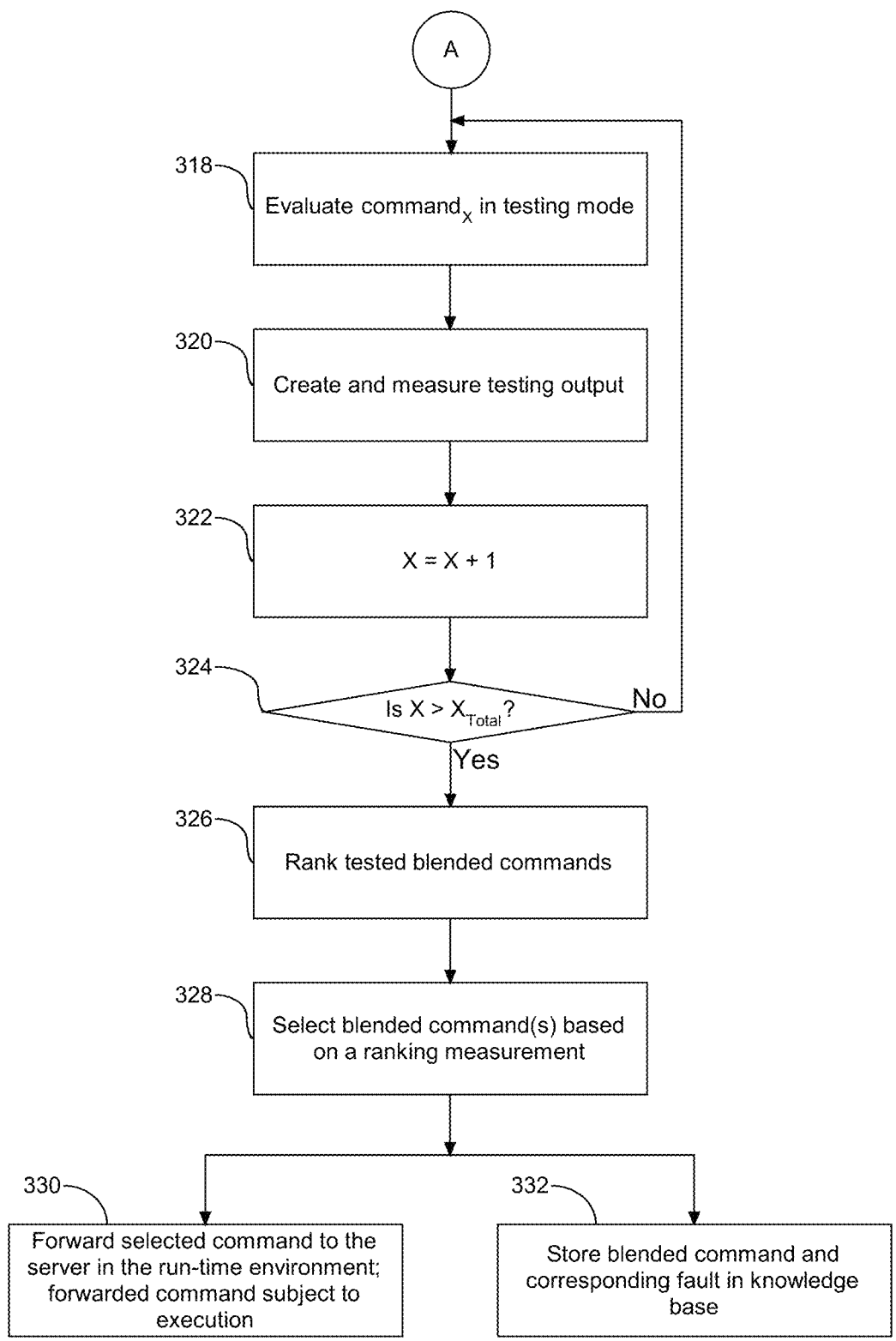

Referring to FIG. 3A and FIG. 3B, a flow chart (300) is provided illustrating a process for integrating context into an instruction to resolve a fault in a run-time environment. As shown, a generalized search query is submitted to) a corresponding search engine (302). The query at step (302) is directed at resolving a fault, e.g. information technology operational information, from public sources. The query produces responses which are placed in an order, such as a ranking, (304). The order at step (304) is based on relevance or relevance criteria of the responses with respect to the query content. The query response(s) are directed at parameters or general syntax for a command, which is in a generalized format and not tailored to the specific run-time environment. More specifically, the query response(s) may include parameters or general syntax for a command, which is in a generalized format and not tailored to the specific run-time environment. As such, following step (304), the returned query response(s) are transformed into one or more corresponding consumable commands (306). Accordingly, the first part of the fault resolution is directed at leveraging public resources to identify publicly available fault resolution.

Context, characteristics, and/or descriptive elements of the fault and the run-time environment are subject to identification in order to further transform the consumable commands from step (306) into context driven commands. As shown, an artificial intelligence (AI) platform is employed to run recurrent neural network(s) to identify or predict context corresponding to the detected fault (308). The context data may include, but is not limited to, characteristics of the engine in the run-time environment, characterizing data associated with the command instructions attached to the query at step (302), and characterizing data associated with the consumable commands returned at step (306). In one embodiment, the recurrent neural network(s) utilized at step (308) utilizes Long Short-Term-Memory (LSTM) for context vector generation directed at identified context. The identified and/or predicted context from step (308) is integrated into the transformed consumable command(s) from step (306), effectively customizing the consumable commands and transforming the consumable commands into one or more blended commands (310). This integration includes an encoding of the blended command(s) into a context-aware instruction. In one embodiment, the context-aware instruction includes one or more command lines or instructions. Accordingly, the AI platform is utilized to identify and integrate context associated into the consumable command(s), thereby customizing a command or instruction for resolving the fault to the submitted query and the run-time environment.

Prior to executing the blended command, a testing environment is leveraged to verify the blended command, and in one embodiment use the verification to determine if the blended command will function to resolve the fault. As shown, a private testing environment is created or otherwise utilized for evaluating and measuring the efficacy of the blended command(s) (312). The variable $X_{Total}$ is assigned to the quantity of blended commands selected or identified for evaluation (314), and a corresponding blended command counting variable is initialized (316). The blended command, command$_X$, is tested or executed in a testing mode (318), e.g. testing environment, output from the testing is created, and in one embodiment measured, (320). In one embodiment, the testing environment may be, but is not limited to, a server replica, a container, etc. For example, in one embodiment, the testing environment may be contained within the server (110). The aspect of measuring at step (320) includes applying a distance function and weight to maximize relevance of the blended command subject to evaluation with respect to the detected fault, or in one embodiment an identified error. Following step (320), the blended command counting variable is incremented (322), and it is determined if all of the blended commands have been subject to testing (324). A negative response to the determination at step (324) is followed by a return to step (318). However, a positive response to the determination at step (324) is following by ranking or otherwise placing the tested blended commands into an order based on their corresponding testing measurements (326). Based on a ranking measurement, one of the blended commands in the ordering is selected (328). In one embodiment, the selection at step (328) is based on an optimal command responsive to the ordering, e.g. the best matched command. The selected blended command is forwarded to the server in the run-time environment such that the blended command is subject to being executed (330). In addition, the blended command and the corresponding fault are stored in a knowledge base (332). Accordingly, the AI platform identifies context and integrates the context into a command or instruction thereby effectively customizing the fault resolution for the run-time environment.

Referring to FIG. 4, a block diagram (400) is provided to illustrate a structure of blended commands for use as a resource in resolving faults in the run-time environment. As shown in FIG. 3, blended commands are subject to evaluation and testing prior to being forwarded to the server for execution. The blended commands are stored in a knowledge base to create a structure of blended commands that have been created to resolve errors in the run-time environment. Each blended command is associated with the corresponding error, identified context, and the general command. For example, a first entry (410) is shown with blended command ($BC_0$) (412), the identified error ($E_0$) (414), the identified context ($C_0$) (416), and the general command ($GC_0$) (418); a second entry (420) is shown with blended command ($BC_1$) (422), the identified error ($E_1$) (424), the identified context ($C_1$) (426), and the general command ($GC_1$) (428); a third entry (430) is shown with blended command ($BC_2$) (432), the identified error ($E_2$) (434), the identified context ($C_2$) (436), and the general command ($GC_2$) (438). Although only three entries are shown, the quantity should not be considered limiting. Accordingly, the structure of command(s) shown herein functions as a corpus of commands and corresponding command patterns.

Figure 5:
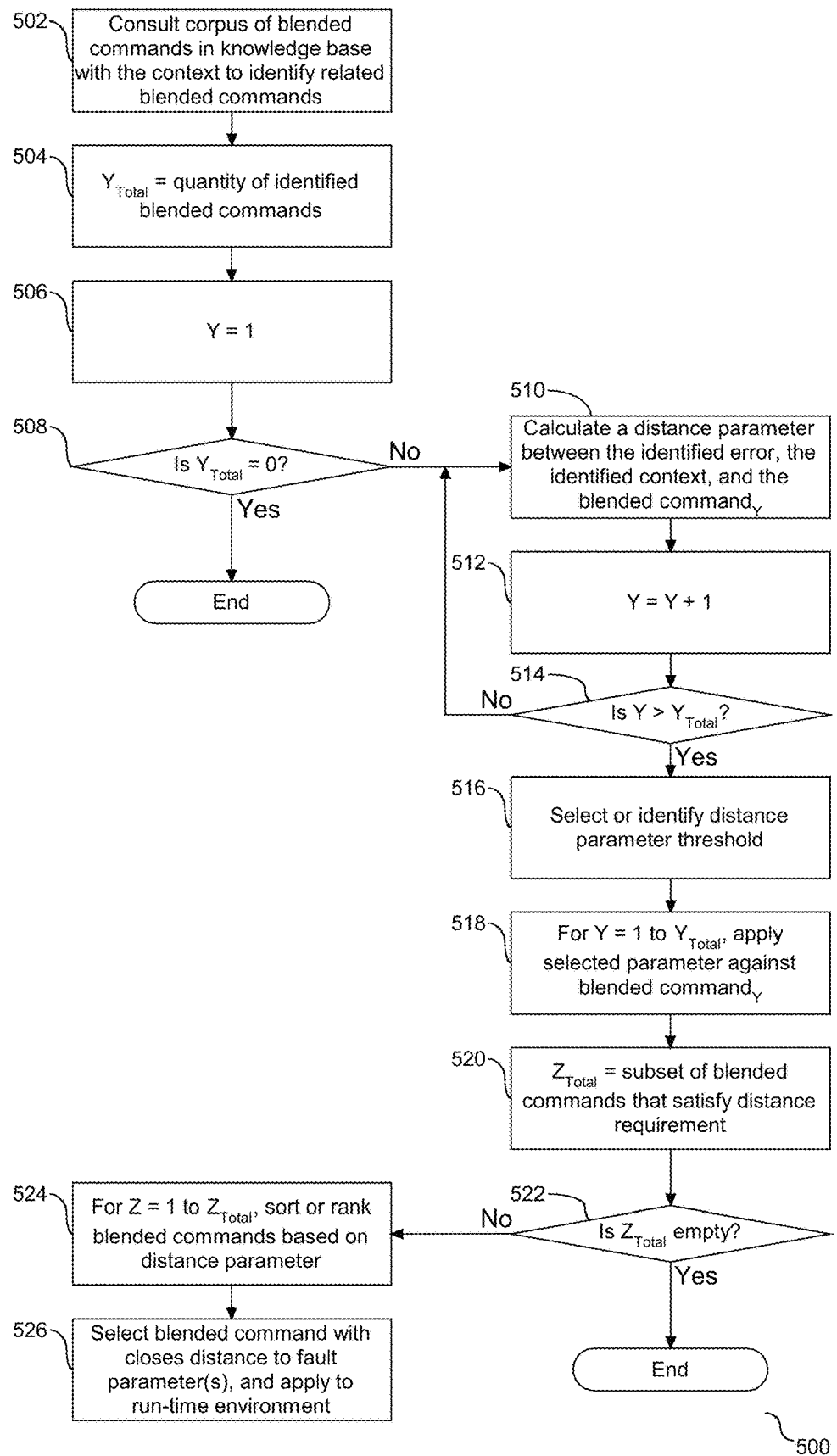
FIG. 5 depicts a flow chart to illustrate a process for leveraging the structure shown and described in FIG. 4.

Referring to FIG. 5, a flow chart (500) is provided to illustrate a process for leveraging the structure shown and described in FIG. 4. As shown and described in FIGS. 1 and 3, an artificial intelligence (AI) platform is leveraged to identify context related to the error or fault in the run time environment. Using the context associated with the error, the corpus of blended commands in the knowledge base is consulted to identify presence of any blended commands that relate to the identified error and the context (502). The relationship may be based on the general command corresponding to the error and/or the context. In one embodiment, the relationship may be based on a relationship of the general commands if there is no direct match. The variable $Y_{Total}$ is assigned to the quantity of identified blended commands (504), and a blending command variable is initialized (506). It is then determined if the set of identified blended commands is empty, e.g. $Y_{Total}$ is zero, (508). A positive response to the determination at step (508) ends the relationship evaluation. However, a negative response to the determination at step (508) is followed by calculating a distance parameter between the identified error, the identified context, and the blended command$_Y$ (510). Following the calculation, the blended command variable, Y, is incremented (512), and an assessment of each of the blended commands for the respective distance parameters (514). A negative response to the determination at step (514) is followed by a return to step (510) to continue assessing the respective distances, and a positive response concludes the distance assessments. Accordingly, for each of the identified blended commands an assessment is conducted to quantify the distance with respect to the fault and/or content.

A blended command with a shorter distance parameter may have a stronger correlation to the outstanding fault in comparison to a blended command with a larger distance parameter. In one embodiment, a threshold may be applied with respect to the distance parameters to remove blended command entries that are considered too remote from the outstanding fault. As shown, the threshold is selected or otherwise identified (516), and applied against each of the blended commands, $y_{Total}$ (518). The variable $Z_{Total}$ is assigned to a subset of blended commands from $Y_{Total}$ that meet the distance requirement (520). It is then determined if $Z_{Total}$ is an empty set (522). A positive response to the determination at step (522) indicates that there are no blended commands in the knowledge base that correspond to the parameters of the fault being evaluated. In one embodiment, the threshold parameter at step (526) may be adjusted or otherwise revisited following a positive response to the determination at step (522). However, a negative response to the determination at step (522) is followed by a sorting or ranking of the blended commands based on the assessed distance parameters (524). The blended command in the subset with the closest distance to the fault parameters is select and applied to the run-time environment (526). Accordingly, the knowledge base is leveraged to selectively apply blended commands created for previously resolved errors.

As shown in FIG. 5, the goal is to measure and identify the best matched command through relevance ranking. The following is an example of an algorithm for measuring the best matched command:

Given relevance function r, an ordered command list $p_1, \ldots, p_m$ is returned for a query, q. A decreasing weight, $c_i$, is applied to find the commands that maximize the relevance, $$\max_{0<i\leq N} \{c_i \cdot t_i \cdot r(p_i \cdot q)\}$$

where $c_i$ reflects a likelihood of successful command execution on the ith trial, $t_i$ is the testing results $\{0,1\}$ in the previous step, and $r(p_i \cdot q)$ represents a distance function, e.g., relevance, of the command $p_i$ and query q.

Figure 6:
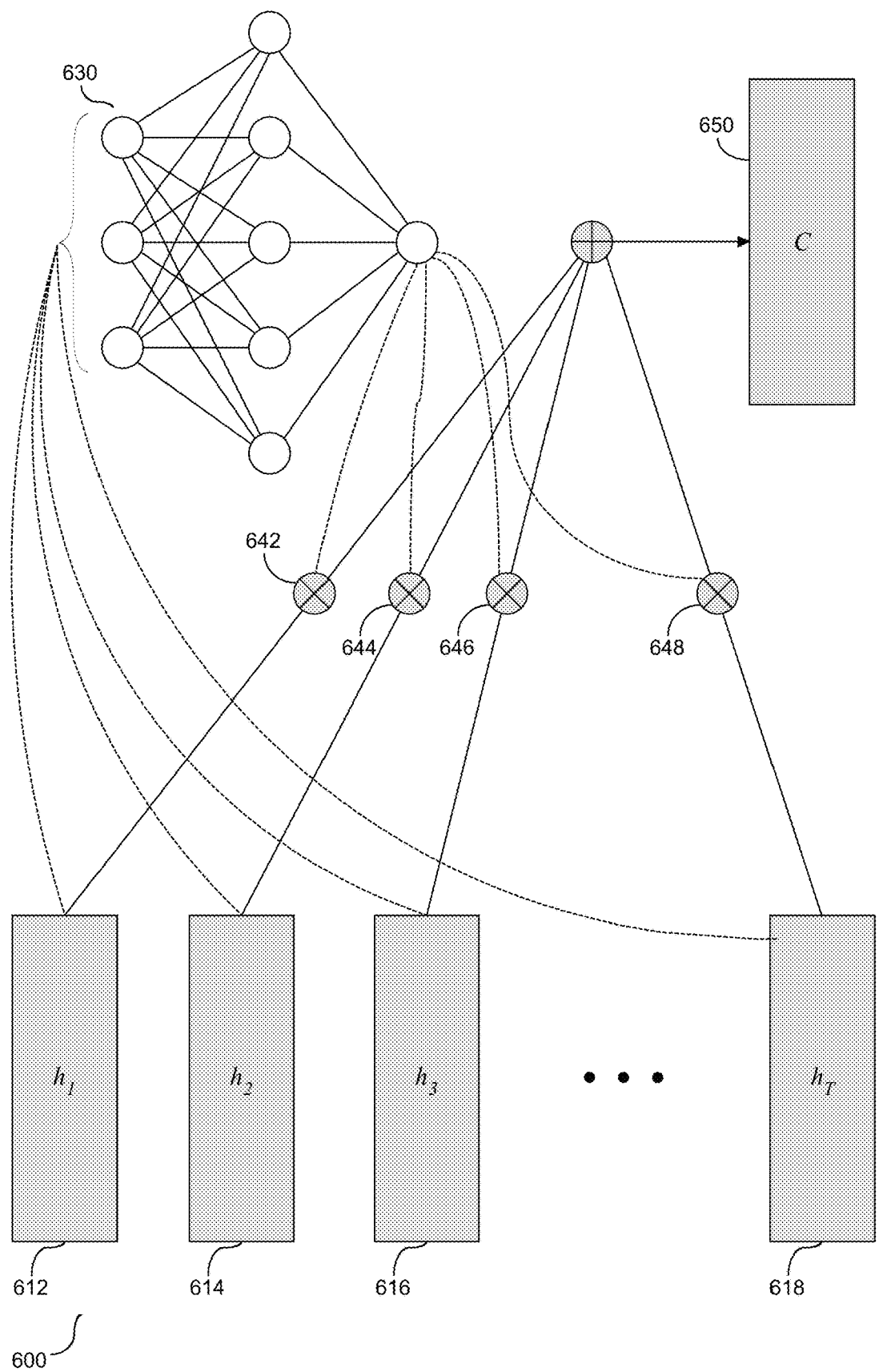
FIG. 6 depicts a diagram to illustrate neural machine translation with LSTM.

As shown and described, context blending entails identifying a related general command and modifying that command with context associated with the fault and the run-time environment. In one embodiment, the AI platform uses sequence learning, classification, and identification from Long Short-Term Memory (LSTM) deep learning (DL), wherein input is ingested, and weights and boundaries are applied to generate output. Referring to FIG. 6, a diagram (600) is provided to illustrate neural machine translation with LSTM. As shown, vectors in a hidden state sequence are shown as $h_1$ (612), $h_2$ (614), $h_3$ (616), and $h_T$ (618). The vectors are fed into a learnable function (630), $\alpha(h_T)$, to produce a probability vector, $\alpha$, shown herein as $\alpha_1$ (642), $\alpha_2$ (644), $\alpha_3$ (646), and $\alpha_T$ (648). Vector c, (650) is computed as a weighted average of a product of the vectors (612)-(618) with the weight given by the respective probability vectors (642)-(648), respectively. Accordingly, as shown and described herein a numerical assessment of context is calculated for application to a general command.

Embodiments may be in the form of a computer program device for use with an intelligent computer platform in order to assist the intelligent computer platform to leverage and integrate context into a general command for fault resolution. The device has program code embodied therewith. The program code is executable by a processing unit to execute the functionality of the tools of the information handling system (152), e.g. query manager (154), context manager (156), and evaluator (158). Aspects of the functional tools, e.g. query manager, context manager, and evaluator, and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments (760) where tasks are performed by remote processing devices that are linked through a communications network. In a distributed cloud computing environment, program modules may be located in both local and remote computer system storage media including memory storage devices.

Figure 7:
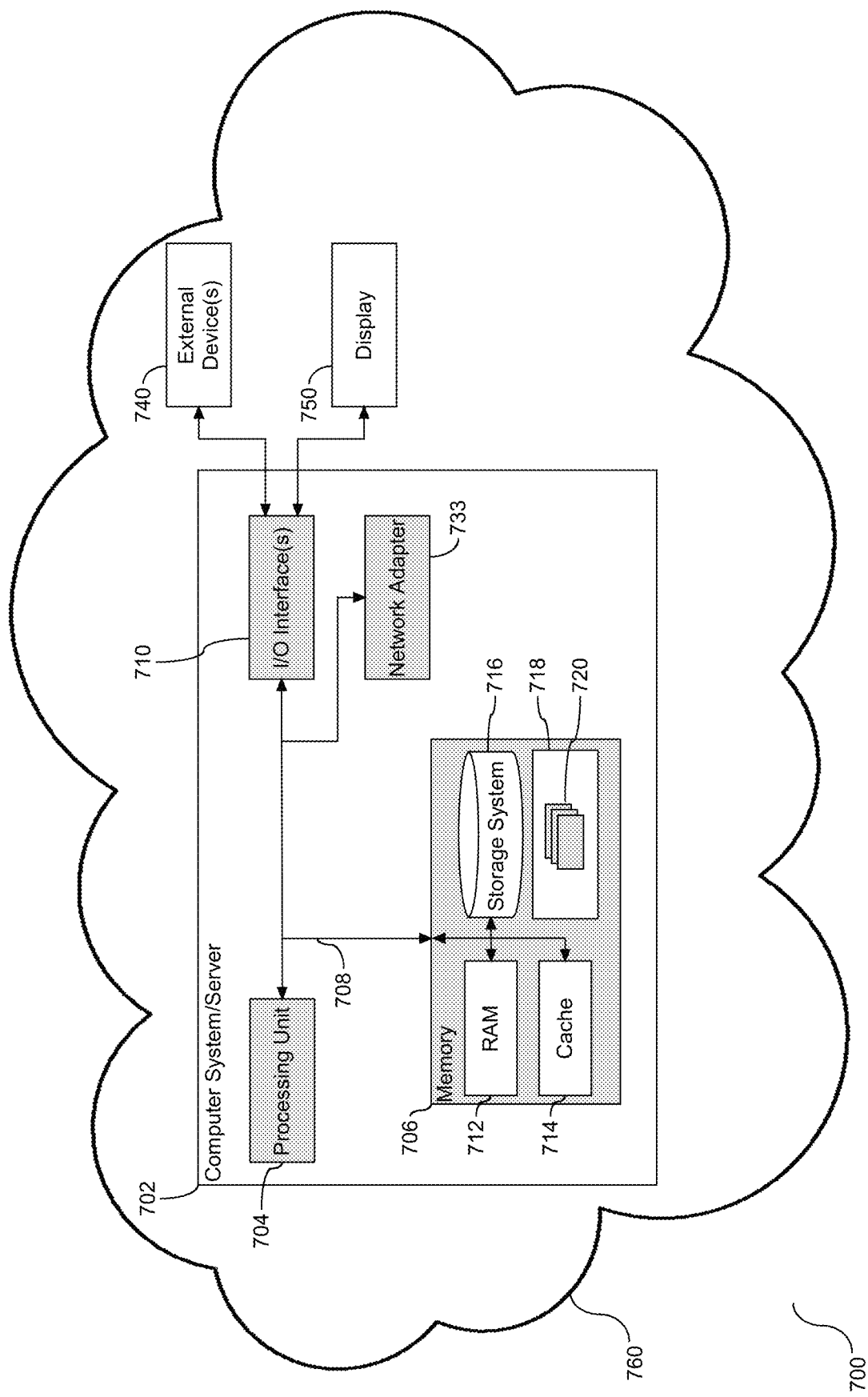
FIG. 7 depicts a block diagram illustrating an example of a computer system/server of a cloud based support system, to implement the system and process described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (702) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (712) and/or cache memory (714). By way of example only, storage system (716) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (718), having a set (at least one) of program modules (720), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (720) generally carry out the functions and/or methodologies of embodiments supported by the information handling system (152) and the tools (154)-(158). For example, the set of program modules (720) may include the modules configured as the query manager, context manager, and evaluator, as described in FIGS. 1-6.

Host (702) may also communicate with one or more external devices (740), such as a keyboard, a pointing device, etc.; a display (750); one or more devices that enable a user to interact with host (702); and/or any devices (e.g., network card, modem, etc.) that enable host (702) to communicate with one or more other computing devices. Such communication can occur via Input/Output (I/O) interface(s) (710). Still yet, host (702) can communicate with one or more networks such as a local area network (LAN), a general wide area network (WAN), and/or a public network (e.g., the Internet) via network adapter (730). As depicted, network adapter (730) communicates with the other components of host (702) via bus (708). In one embodiment, a plurality of nodes of a distributed file system (not shown) is in communication with the host (702) via the I/O interface (710) or via the network adapter (730). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (712), cache (714), and storage system (716), such as a removable storage drive and a hard disk installed in a hard disk drive.

Computer programs (also called computer control logic) are stored in memory (706). Computer programs may also be received via a communication interface, such as network adapter (730). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
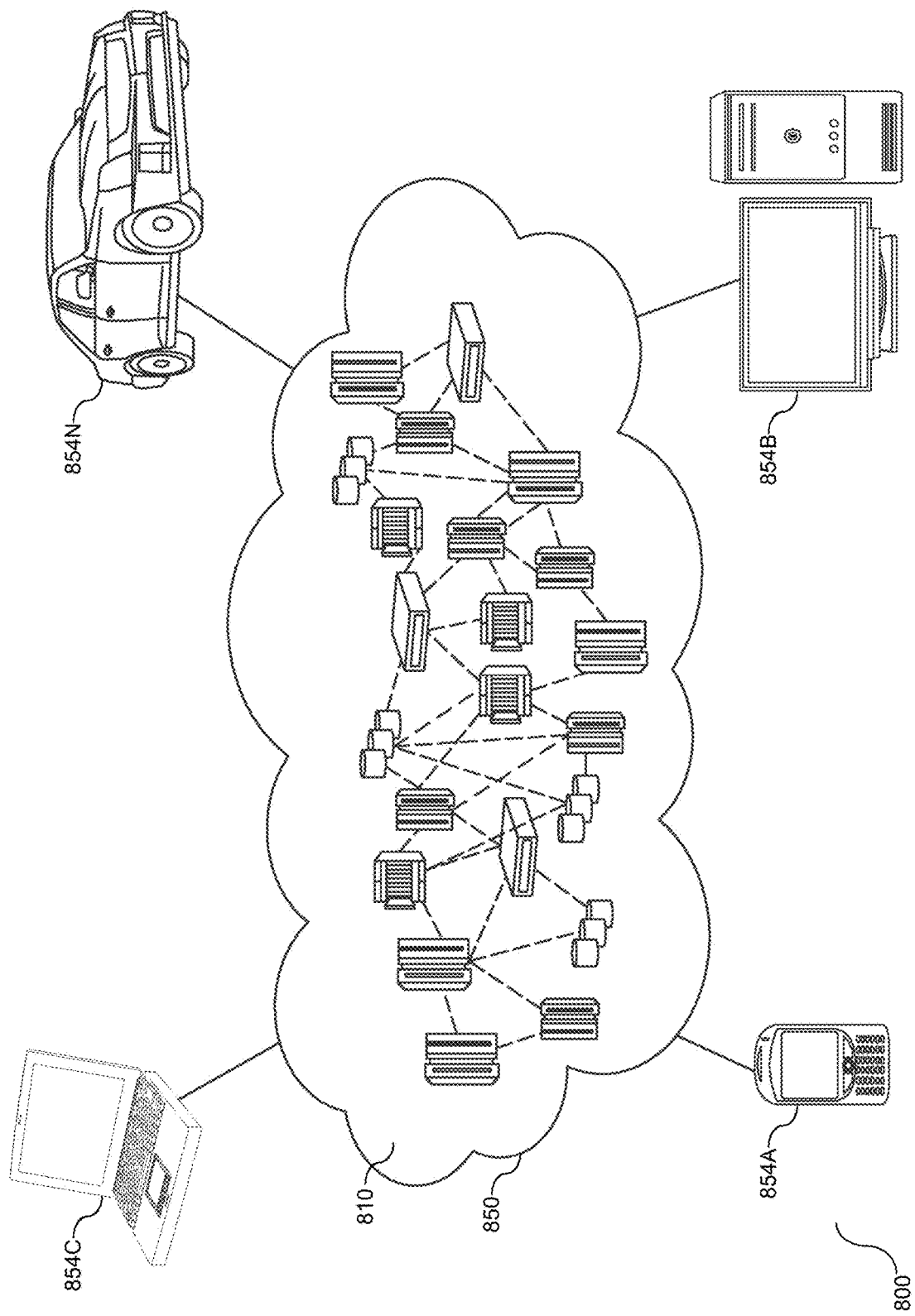
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
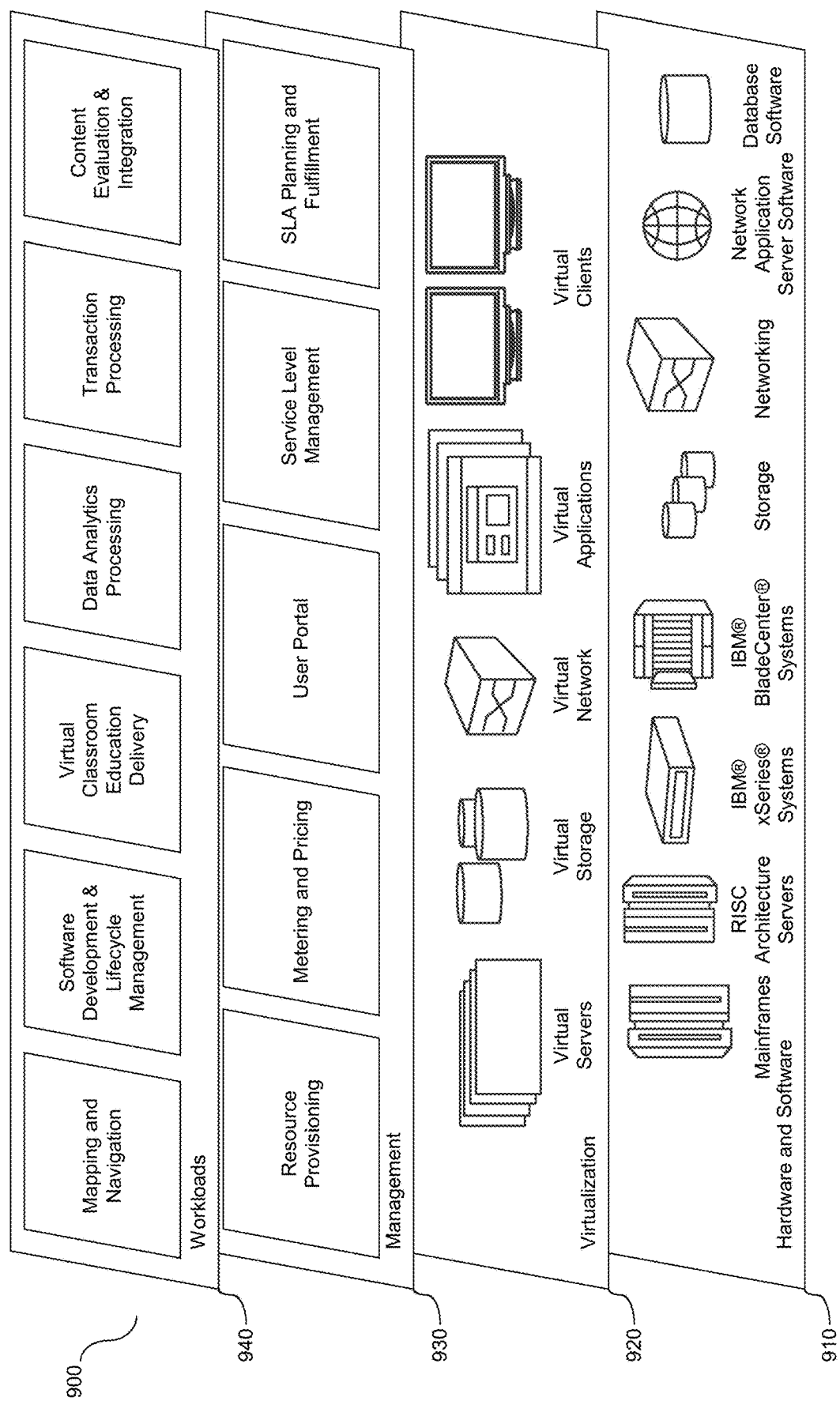
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940). The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and context evaluation and integration.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the leverage of context into the word and document vector representations and associated vector modeling provides context sensitivity with respect to sentence and/or key word identification.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiment may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiment may take the form of computer program product embodied in a computer readable storage medium (or media) having computer readable program instructions thereon for causing a processor to carry out aspects of the present embodiment. Thus embodied, the disclosed system, a method, and/or a computer program product is operative to improve fault resolution in a run-time environment based on context identification and evaluation and integration of the context into a blended command.

Aspects of the present embodiment are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the context identification shown and described herein may be identified dynamically over a period of time and used for generation blended commands. Accordingly, the scope of protection of the embodiments is limited only by the following claims and their equivalents.

What is claimed is:

1. A computer system comprising:
    a processing unit operatively coupled to memory;
    an information handling system in communication with the processing unit, the information handling system to support natural language processing, including:
        a query manager to detect a fault in a run-time environment, generate a search query command related to the detected fault, and receive one or more general query responses corresponding to the detected fault;
        the query manager to identify relevance criteria from a query associated with the detected fault, apply the identified relevance criteria to the received one or more general query responses, and assign a priority to the one or more query responses based on application of the relevance criteria;
        the query manager to select at least one of the one or more query responses based on the assigned priority, and transform the selected at least one response into a consumable general command;
        a context manager operatively coupled to the query manager, the context manager to identify context corresponding to the detected fault, and to selectively blend the identified context into the transformed consumable general command, including the context manager to encode the blended transformed command as a context-aware instruction; and
        an evaluator to test the context-aware instruction in a private testing environment, including the evaluator to measure an output of the tested context-aware instruction; and
    the processing unit to selectively execute the context-aware instruction responsive to the testing output.

2. The system of claim 1, further comprising the context manager to invoke a recurrent neural net based model to generate one or more vectors directed at the identified context.

3. The system of claim 2, further comprising the evaluator to measure the tested context-aware instruction, including apply a distance function and weight to maximize relevance to the detected fault.

4. The system of claim 2, further comprising the context manager to build a corpus of commands and a corresponding command pattern, the pattern including a map of the identified context, detected fault, and a corresponding blended command.

5. The system of claim 4, further comprising the context manager to consult the corpus and apply a distance parameter to identify a relationship between the detected fault and at least one blended command, and responsive to the relationship, selectively apply the blended command to resolve the detected fault.

6. A computer program product to create and apply context to a consumable instruction, the computer program product comprising a computer readable storage device having program code embodied therewith, the program code executable by a processing unit to:

detect a fault in a run-time environment, generate a search query command related to the detected fault, and receive one or more general query responses corresponding to the detected fault;

identify relevance criteria from a query associated with the detected fault, apply the identified relevance criteria to the received one or more general query responses, and assign a priority to the query responses based on application of the relevance criteria;

select at least one of the one or more query responses based on the assigned priority, and transform the selected at least one response into a consumable general command;

identify context corresponding to the detected fault, and selectively blend the identified context into the transformed consumable general command, including encode the blended transformed command as a context-aware instruction; and test the context-aware instruction in a private testing environment, including measure an output of the tested context-aware instruction; and selectively execute the context-aware instruction responsive to the testing output.

7. The computer program product of claim 6, further comprising program code to invoke a recurrent neural net based model to generate one or more vectors directed at the identified context.

8. The computer program product of claim 7, further comprising program code to measure the tested context-aware instruction, including apply a distance function and weight to maximize relevance to the detected fault.

9. The computer program product of claim 7, further comprising program code to build a corpus of commands and a corresponding command pattern, the pattern including a map of the identified context, detected fault, and a corresponding blended command.

10. The computer program product of claim 9, further comprising program code to consult the corpus and apply a distance parameter to identify a relationship between the detected fault and at least one blended command, and responsive to the relationship, selectively apply the blended command to resolve the detected fault.

11. A method comprising:

detecting a fault in a run-time environment, generating a search query command related to the detected fault, and receiving one or more general query responses corresponding to the detected fault;

identifying relevance criteria from a query associated with the detected fault, applying the identified relevance criteria to the received one or more general query responses, and assigning a priority to the one or more query responses based on application of the relevance criteria;

selecting at least one of the one or more query responses based on the assigned priority, and transforming the selected at least one response into a consumable general command;

identifying context corresponding to the detected fault, and selectively blending the identified context into the transformed consumable general command, including encoding the blended transformed command as a context-aware instruction; and testing the context-aware instruction in a private testing environment, including measuring an output of the tested context-aware instruction; and selectively executing the context-aware instruction responsive to the testing output.

12. The method of claim 11, further comprising invoking a recurrent neural net based model to generate one or more vectors directed at the identified context.

13. The method of claim 12, further comprising measuring the tested context-aware instruction, including applying a distance function and weight to maximize relevance to the detected fault.

14. The method of claim 12, further comprising building a corpus of commands and a corresponding command pattern, the pattern including a map of the identified context, detected fault, and a corresponding blended command.

15. The method of claim 14, further comprising consulting the corpus and applying a distance parameter to identify a relationship between the detected fault and at least one blended command, and responsive to the relationship, selectively applying the blended command to resolve the detected fault.

\* \* \* \* \*